(12) United States Patent
Yoon (10) Patent No.: US 12,170,084 B2
(45) Date of Patent: Dec. 17, 2024

(54) CONTROL DEVICE AND SYSTEM INCLUDING THE SAME

(71) Applicant: LG ELECTRONICS INC., Seoul (KR)

(72) Inventor: Junghoon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 323 days.

(21) Appl. No.: 17/354,845

(22) Filed: Jun. 22, 2021

(65) Prior Publication Data

US 2021/0398532 A1 Dec. 23, 2021

(30) Foreign Application Priority Data

Jun. 22, 2020 (KR) .................. 10-2020-0075541

(51) Int. Cl.
  *G06F 3/14* (2006.01)
  *G06F 3/01* (2006.01)
  *G06F 3/16* (2006.01)
  *G10L 15/22* (2006.01)

(52) U.S. Cl.
  CPC ............. *G10L 15/22* (2013.01); *G06F 3/016* (2013.01); *G06F 3/14* (2013.01); *G06F 3/167* (2013.01); *G10L 2015/223* (2013.01)

(58) Field of Classification Search
  CPC ..... H03G 3/20; G10L 15/22; G10L 2015/223; G06F 3/016; G06F 3/14; G06F 3/167; G09G 2330/021
  USPC .................................. 381/110, 123; 704/251
  See application file for complete search history.

(56) References Cited

FOREIGN PATENT DOCUMENTS

| EP | 3382949 | 10/2018 |
|----|---------|---------|
| KR | 1020090132249 | 12/2009 |
| KR | 1020150093491 | 8/2015 |
| KR | 1020160056577 | 5/2016 |

OTHER PUBLICATIONS

European Patent Office Application Serial No. 21180287.1 Search Report dated Oct. 20, 2021, 10 pages.
Korean Intellectual Property Office Application No. 10-2020-0075541, Notice of Allowance dated Nov. 11, 2021, 2 pages.
Korean Intellectual Property Office Application No. 10-2020-0075541, Office Action dated Jul. 8, 2021, 5 pages.

*Primary Examiner* — George C Monikang
(74) *Attorney, Agent, or Firm* — LEE, HONG, DEGERMAN, KANG & WAIMEY (57) ABSTRACT

The present disclosure relates to a control device and a system including the same. The control device according to an embodiment of the present disclosure comprises: an external device interface configured to transmit and receive signals to and from a display device; a user input interface configured to receive a user input; an audio output unit including a speaker; and a controller configured to: when a first voice input is received through the user input interface in a standby mode, check a first command corresponding to the first voice input; transmit a signal for activating a function of the display device to the display device through the external device interface when the first command is a command related to image output; and output a response to the first command through the audio output unit when the first command is not the command related to image output.

10 Claims, 10 Drawing Sheets

CONTROL DEVICE AND SYSTEM INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2020-0075541, filed on Jun. 22, 2020, the contents of which are hereby incorporated by reference herein in its entirety.

BACKGROUND OF THE INVENTION

Field of the disclosure

The present disclosure relates to a control device and a system including the same.

Description of the Related Art

A display device is a device having a function of displaying an image that can be viewed by a user. In recent years, with the development of the information society, as the demand for display device has increased in various forms, various display devices, such as Liquid Crystal Display apparatus (LCD), Plasma Display Panel (PDP), Electro luminescent Display (ELD), Vacuum Fluorescent Display (VFD), and the like, have been researched and used.

A conventional display device may basically output an image through a display panel but must provide a separate speaker or be connected to an external audio device for audio output, and it is common that the speaker is disposed on side ends, upper and lower ends, or the rear of the display panel when the speaker is provided in the display device. However, there is a problem that the immersion of a user viewing the video is hindered because the direction of the sound output from the speaker and the direction in which the user looks at the display panel are different from each other when the speaker is provided in the display device, and there is also a problem that restrictions on the design and space arrangement of the display device occur due to the space and weight occupied by the speaker in the display device.

In consideration of this point, recent display devices are developed to output sound to the front of the display panel in which the user is located through a vibration of the display panel itself, thereby solving a problem that hinders the user's immersion, and simultaneously satisfying weight reduction and aesthetics.

However, despite these various studies, in order to differentiate from other products and secure competitiveness, there is still a need for a technology that can further improve a performance of the display device and a system including the same. For example, even when not outputting an image, the conventional display device needs to always maintain an activated state to receive a user input or output a response to the received user input, resulting in unnecessary power consumption.

SUMMARY

It is an object of the present disclosure to solve the above and other problems.

It is another object of the present disclosure to provide a control device and a system including the same that may respond to a command corresponding to a user input while effectively reducing power consumption of the entire system.

In accordance with an aspect of the present disclosure, a control device may comprises: an external device interface configured to transmit and receive signals to and from a display device; a user input interface configured to receive a user input; an audio output unit including a speaker; and a controller configured to: when a first voice input is received through the user input interface in a standby mode, check a first command corresponding to the first voice input; transmit a signal for activating a function of the display device to the display device through the external device interface when the first command is a command related to image output; and output a response to the first command through the audio output unit when the first command is not the command related to image output.

In accordance with an aspect of the present disclosure, a system includes a display device and a control device, wherein the display device comprises a display panel and a main audio output unit, wherein the control device comprises a sub audio output unit, wherein the control device is configured to: when a first voice input is received in a standby mode, check a first command corresponding to the first voice input; transmit a signal for activating a function of the display device to the display device when the first command is a command related to image output; and output a response to the first command through the sub audio output unit when the first command is not the command related to image output.

According to the present disclosure, the control device and system including the same.

According to various embodiments of the present disclosure, since the function of the display device is deactivated in the standby mode and a response to a command is output through a sub audio output unit separately provided in the control device until a command related to image output is received, it is not necessary to activate the function of the display device to wait for and output the response, thereby effectively reducing the power consumption of the entire system.

Furthermore, according to various embodiments of the present disclosure, the control device may supply power to the display device when releasing the standby mode and cut off power supplied to the display device when entering the standby mode, thereby minimizing power consumed by the display device while maintaining the standby mode.

The additional range of applicability of the present disclosure will become apparent from the following detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

BRIEF DESCRIPTION OF THE DRAWINGS

FIGS. 7 to 8B are diagrams referenced for explaining a method of operating the control device.

DESCRIPTION OF EXEMPLARY EMBODIMENTS

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and the "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

Figure 1:
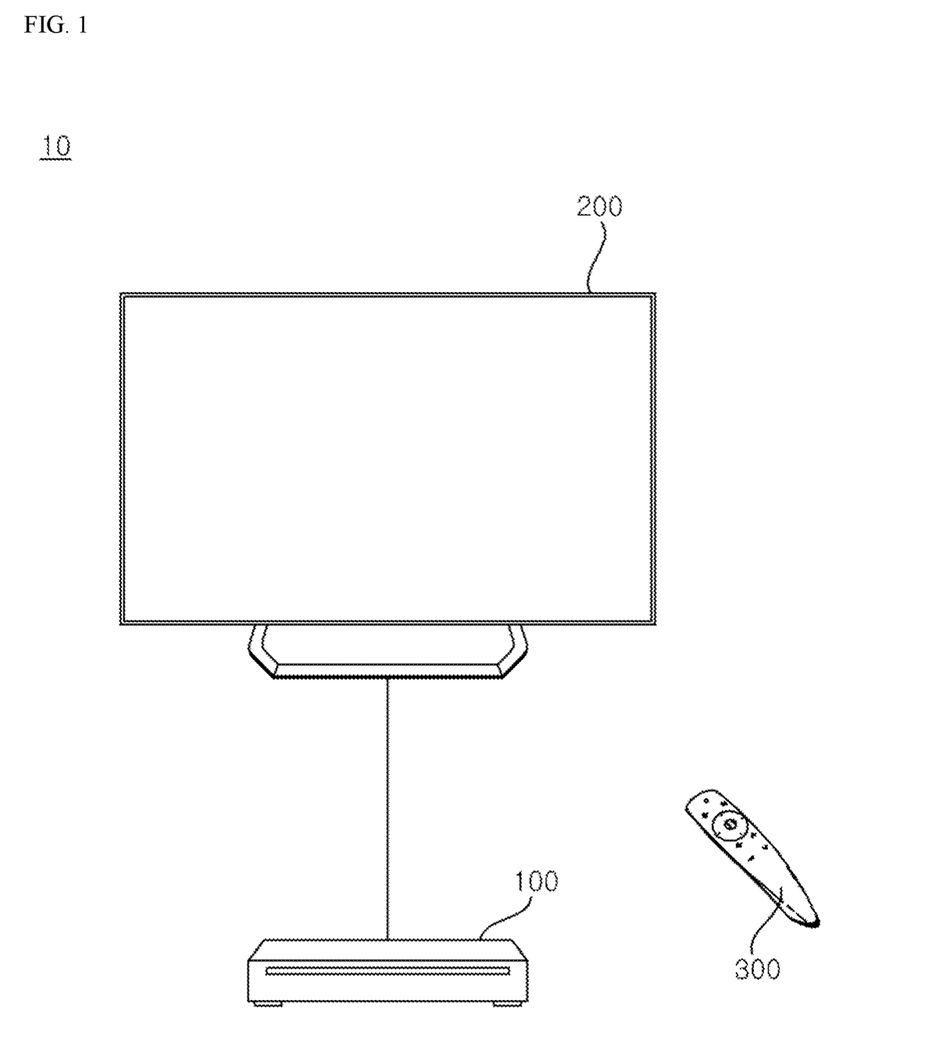
FIG. 1 is a diagram illustrating a system according to an embodiment of the present disclosure.

FIG. 1 is a diagram illustrating a system according to an embodiment of the present disclosure.

Referring to FIG. 1, a system 10 may include a control device 100, a display device 200 and/or a remote control device 300.

The control device 100 may be a device that controls the display device 200. For example, the control device 100 may transmit a control signal for controlling the operation of the display device 200 to the display device 200.

The control apparatus 100 may receive a broadcast signal, process the broadcast signal, and transmit a signal-processed image signal and/or a signal-processed audio signal to the display device 200.

The control device 100 may receive a broadcast signal wirelessly through an antenna or may receive a broadcast signal through a cable. For example, the control device 100 may receive a terrestrial broadcast signal, a satellite broadcast signal, a cable broadcast signal, an Internet Protocol Television (IPTV) broadcast signal, and the like.

The display device 200 may be a device that processes and outputs an image. The display device 200 is not particularly limited as long as it can output a screen corresponding to an image signal, such as a TV, a notebook computer, or a monitor.

The remote control device 300 may be connected to the control device 100 by wire and/or wirelessly to provide various control signals to the control device 100. In this case, the remote control device 300 may include a device that establishes a wired or wireless network with the control device 100 and transmits various control signals to the control device 100 through the established network, or receives a signal related to various operations processed by the control device 100 from the control device 100.

For example, various input devices, such as a mouse, a keyboard, a space remote controller, a trackball, a joystick, and the like may be used as the remote control device 300. The remote control device 300 may be referred to as an external device, and hereinafter, it should be noted that an external device and a remote control device can be mixed and used, if necessary.

The control device 100 may be connected to only a single remote control device 300, or connected to two or more remote control devices 300 at the same time, and may change the object displayed on a screen or adjust the state of the screen, based on a control signal provided from each remote control device 300.

Meanwhile, the system 10 may further include an external server. The external server may transmit and receive data to and from the control device 100 through a network, and may process data received from the control device 100.

Figure 2:
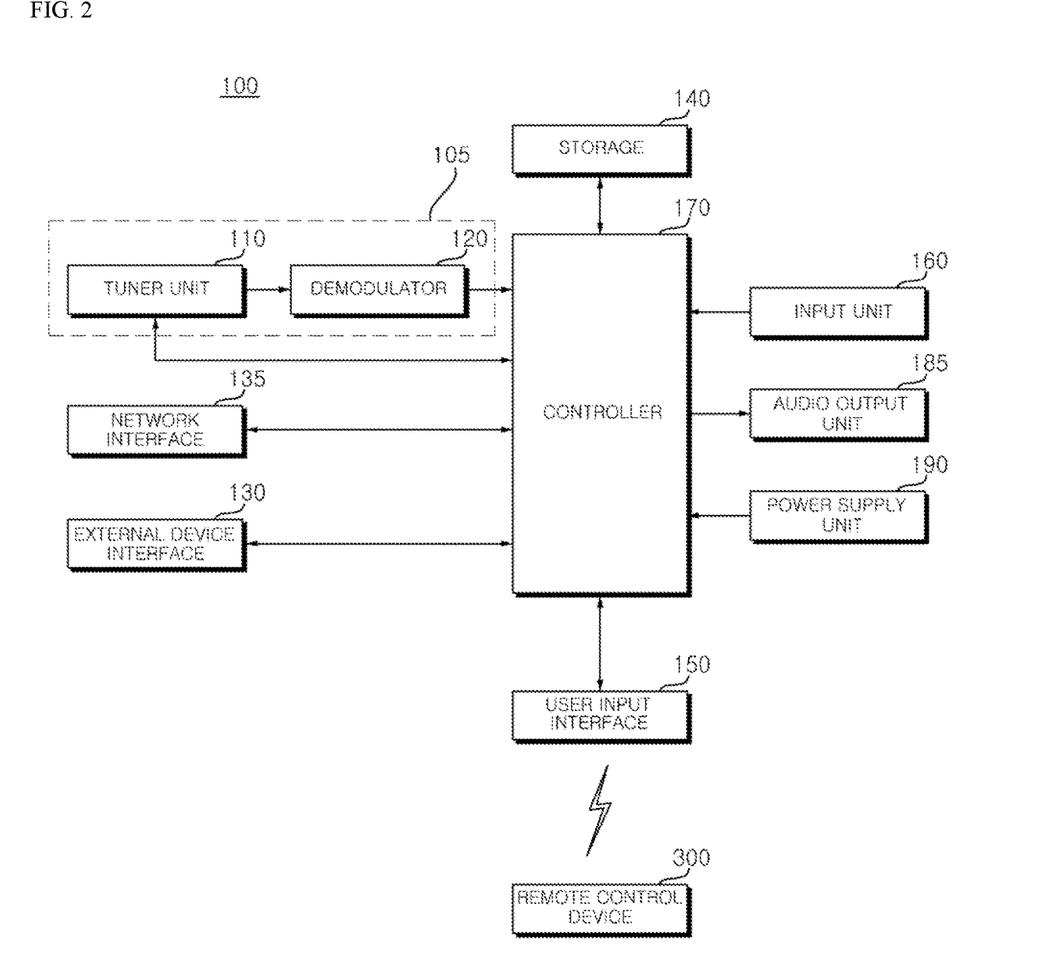
FIG. 2 is an internal block diagram of the control device of FIG. 1.

FIG. 2 is an internal block diagram of the control device of FIG. 1.

Referring to FIG. 2, the control device 100 may include a broadcast reception unit 105, an external device interface 130, a network interface 135, a storage unit 140, a user input interface 150, an input unit 160, a controller 170, an audio output unit 185 and/or a power supply unit 190.

The broadcast reception unit 105 may include a tuner 110 and a demodulation unit 120.

The tuner 110 may select a broadcast signal corresponding to a channel selected by a user or all previously stored channels from among broadcast signals received through an antenna or a cable. The tuner 110 may convert the selected broadcast signal into an intermediate frequency signal, a baseband image, or an audio signal.

For example, if the selected broadcast signal is a digital broadcast signal, the tuner 110 may convert the digital broadcast signal into a digital IF signal (DIF). If the selected broadcast signal is an analog broadcast signal, the tuner 110 may convert the analog broadcast signal into an analog baseband image or audio signal (CVBS/SIF). That is, the tuner 110 may process a digital broadcast signal or an analog broadcast signal. The analog baseband image or audio signal (CVBS/SIF) output from the tuner 110 may be directly input to the controller 170.

Meanwhile, the tuner 110 may sequentially select broadcast signals of all broadcast channels stored through a channel memory function among received broadcast signals, and convert the broadcast signals into an intermediate frequency signal, a baseband image, or an audio signal.

Meanwhile, the tuner 110 may include a plurality of tuners in order to receive broadcast signals of a plurality of channels. Alternatively, a single tuner that simultaneously receives broadcast signals of multiple channels may be provided.

A demodulation unit 120 may perform a demodulation operation by receiving the digital IF signal DIF converted by the tuner 110.

The demodulation unit 120 may output a stream signal TS after performing demodulation and channel decoding. In this situation, the stream signal may be a signal which is obtained by multiplexing an image signal, an audio signal, or a data signal.

The stream signal output from the demodulation unit 120 may be input to the controller 170. After performing demultiplexing, image/audio signal processing, and the like, the controller 170 may transmit it to the display device 200 through the external device interface 130.

The external device interface 130 may transmit or receive data with a connected external device. To this end, the external device interface 130 may include an A/V input/output unit.

An A/V input/output unit may receive image and audio signals from an external device. For example, the A/V input/output unit may include an Ethernet terminal, a USB terminal, CVBS (Composite Video Banking Sync) terminal, component terminal, S-video terminal (analog), DVI (Digital Visual Interface) terminal, HDMI (High Definition Multimedia Interface) terminal, MHL (Mobile High-definition Link) terminal, RGB terminal, D-SUB terminal, IEEE 1394 terminal, SPDIF terminal, Liquid HD terminal, and the like. Digital signals input through these terminals may be transmitted to the controller 170. In this situation, the analog signal input through the CVBS terminal and the S-video terminal may be converted into a digital signal through an analog-digital converter and transmitted to the controller 170.

The external device interface 130 may be connected to the display device 200 such as a TV, a monitor, and the like by wire/wireless, and may perform input/output operations with the display device 200.

The external device interface 130 may include a wireless communication unit for short-range wireless communication with other electronic device. Through such a wireless communication unit, the external device interface 130 may exchange data with an adjacent mobile terminal. In particular, in a mirroring mode, the external device interface 130 may receive device information, executed application information, application images, and the like from the mobile terminal.

The external device interface 130 may perform short-range wireless communication using Bluetooth, Radio Frequency Identification (RFID), Infrared communication (IrDA, infrared Data Association), UWB (Ultra-Wideband), ZigBee, or the like.

The network interface 135 may provide an interface for connecting to a wired/wireless network including the Internet. For example, the network interface 155 may receive content or data provided by the Internet or a content provider or a network operator through the network.

Meanwhile, the network interface 135 may include a communication module for connection with a wired/wireless network. For example, the network interface 135 may include a communication module for wireless LAN (WLAN) (Wi-Fi), wireless broadband (Wibro), Wimax (World Interoperability for Microwave Access), HSDPA (High Speed Downlink Packet Access), or the like.

The network interface 135 may transmit or receive data with other users or other electronic devices through a connected network or another network linked to the connected network.

The storage unit 140 may store a program for processing and controlling each signal in the controller 170 or may store a signal-processed image, audio, or data signal. For example, the storage unit 140 may store application programs designed for performing various tasks that can be processed by the controller 170, and may provide some of the stored application programs selectively when requested by the controller 170.

Program, or the like stored in the storage unit 140 is not particularly limited as long as they can be executed by the controller 170.

The storage unit 140 may perform a function for temporary storage of an image, audio, or data signal received from an external device through the external device interface 130.

The storage unit 140 may store information on a certain broadcast channel, through a channel storage function such as a channel map.

FIG. 2 illustrates an embodiment in which the storage unit 140 is provided separately from the controller 170, but the scope of the present disclosure is not limited thereto, and the storage unit 140 may be included in the controller 170.

The storage unit 140 may include at least one of volatile memory (e.g. DRAM, SRAM, SDRAM, etc.), and nonvolatile memory (e.g. flash memory, hard disk drive HDD, and solid-state drive SSD, etc.). In various embodiments of the present disclosure, the storage unit 140 and a memory may be used interchangeably.

The user input interface 150 may transmit a signal input by the user to the controller 170, or may transmit a signal from the controller 170 to the user. For example, the user input interface 150 may transmit/receive a user input signal such as power on/off, channel selection, and screen setting from the remote control device 200, transmit a user input signal input from a local key such as a power key, a channel key, a volume key, and a setting key to the controller 170, transmit a user input signal input from a sensor unit that senses a user's gesture to the controller 170, or transmit a signal from the controller 170 to a sensor unit.

The input unit 160 may be provided in one side of the main body of the image display apparatus 100. For example, the input unit 160 may include a touch pad, a physical button, or the like.

The input unit 160 may receive various user commands related to the operation of the image display apparatus 100, and may transmit a control signal corresponding to the input command to the controller 170. The input unit 160 may transmit the control signal corresponding to the input command to the controller 170 through the user input interface 150.

The input unit 160 may include at least one microphone, and may receive a user's voice through the microphone.

The controller 170 may include at least one processor, and may control the overall operation of the image display apparatus 100 by using the processor included therein. Here, the processor may be a general processor such as a central processing unit (CPU). Obviously, the processor may be a dedicated device such as an ASIC or another hardware-based processor.

The controller 170 may receive a user input through the user input interface 150 and/or the input unit 160 and may check a command corresponding to the user input.

When receiving a voice input corresponding to a voice spoken by a user, the controller 170 may check a command included in the voice and may generate a response to the command.

The controller 170 may extract a word included in the voice through voice recognition using natural language processing (NLP) and check a command included in the voice input. Here, the natural language processing technology may mean a technology that mechanically analyzes a human language phenomenon and processes an electronic device to recognize the meaning of the corresponding language phenomenon.

Meanwhile, the controller 170 may transmit the input voice to an external server through the network interface 135 and receive data on a result of voice recognition for the voice from the external server to check a command included in the voice.

The controller 170 may demultiplex the stream input through the tuner 110, the demodulation unit 120, the external device interface 130, or the network interface 135, or may generate and output a signal for image or audio output by processing demultiplexed signals.

The image signal and/or audio signal processed by the controller 170 may be transmitted to the display device 200 through the external device interface 130.

The audio signal processed by the controller 170 may be transmitted to the audio output unit 185.

The audio output unit 185 may include at least one speaker. The audio output unit 185 may receive an audio signal processed by the controller 170 and output it as audio.

Although not shown in FIG. 2, the controller 170 may include a demultiplexer, an image processing unit, and the like.

In addition, the controller 170 may control the overall operation of the control device 100. For example, the controller 170 may control the tuner 110 to select (tune) a channel selected by a user or a broadcast corresponding to a previously stored channel.

Meanwhile, the control device 100 may further include a photographing unit. The photographing unit may photograph a user. The photographing unit may be implemented with one camera, but is not limited thereto, and may be implemented with a plurality of cameras. Meanwhile, the photographing unit may be embedded in the upper portion of the control device 100 or may be separately disposed. Image information photographed by the photographing unit may be input to the controller 170.

The controller 170 may recognize a user's location, based on the image photographed by the photographing unit. For example, the controller 170 may determine a distance (z-axis coordinate) between the user and the image display apparatus 100.

The controller 170 may detect a user's gesture based on the image photographed by the photographing unit, or each of signals detected by the sensor unit or a combination thereof.

The power supply unit 190 may supply corresponding power throughout the image control device 100. In particular, the power supply unit 190 may supply power to the controller 170 that can be implemented in the form of a System On Chip (SOC), the audio output unit 185 for outputting audio, and the like.

Specifically, the power supply unit 190 may include a converter for converting AC power into DC power, and a DC/Dc converter for converting the level of DC power.

Meanwhile, the power supply unit 190 may supply power to the display device 200 connected by wire through the external device interface 130 based on the control of the controller 170. For example, when activating the function of the display device 200, the controller 170 may control the operation of the external device interface 130 and/or the power supply unit 190 so that power is supplied to the display device 200. For example, when deactivating the function of the display device 200, the controller 170 may control the operation of the external device interface 130 and/or the power supply unit 190 so that power supplied to the display device 200 is cut off.

The remote control device 300 may transmit a user input to the user input interface 150. To this end, the remote control device 300 may use Bluetooth, Radio Frequency (RF) communication, Infrared Radiation communication, Ultra-wideband (UWB), ZigBee, and the like. In addition, the remote control device 300 may receive an image, audio, or data signal output from the user input interface 150, and display it on the remote control device 300 or output as an audio.

Meanwhile, the block diagram of the control device 100 shown in FIG. 2 is just a block diagram for an embodiment of the present disclosure, and each component of the block diagram can be combined, added, or omitted in accordance with the specifications of the control device 100 that is actually implemented.

That is, if necessary, two or more components may be combined into a single component, or one component may be subdivided into two or more components. In addition, the functions performed in each block are for explaining the embodiment of the present disclosure, and a specific operation or device thereof does not limit the scope of the present disclosure.

Figure 3:
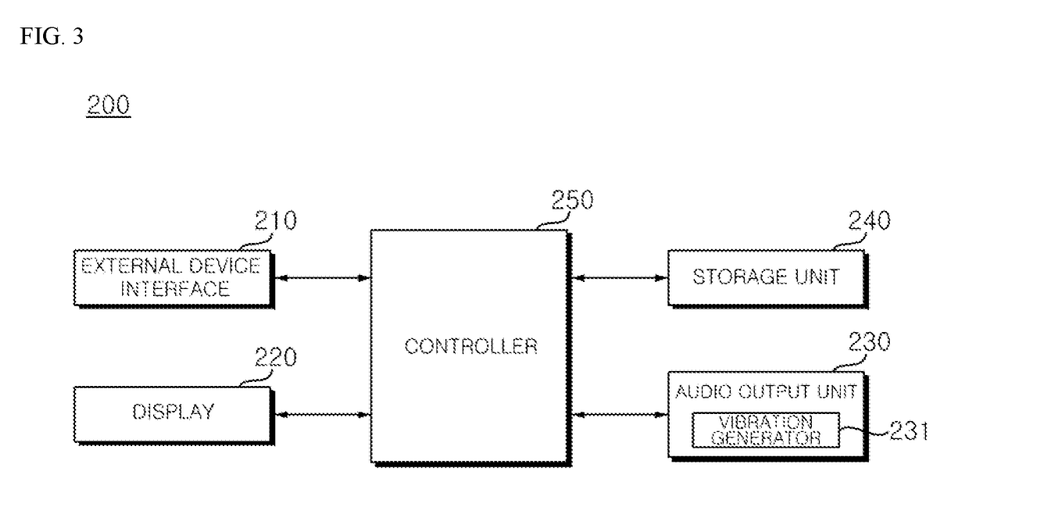
FIG. 3 is an internal block diagram of the display device of FIG. 1.
Figure 4:
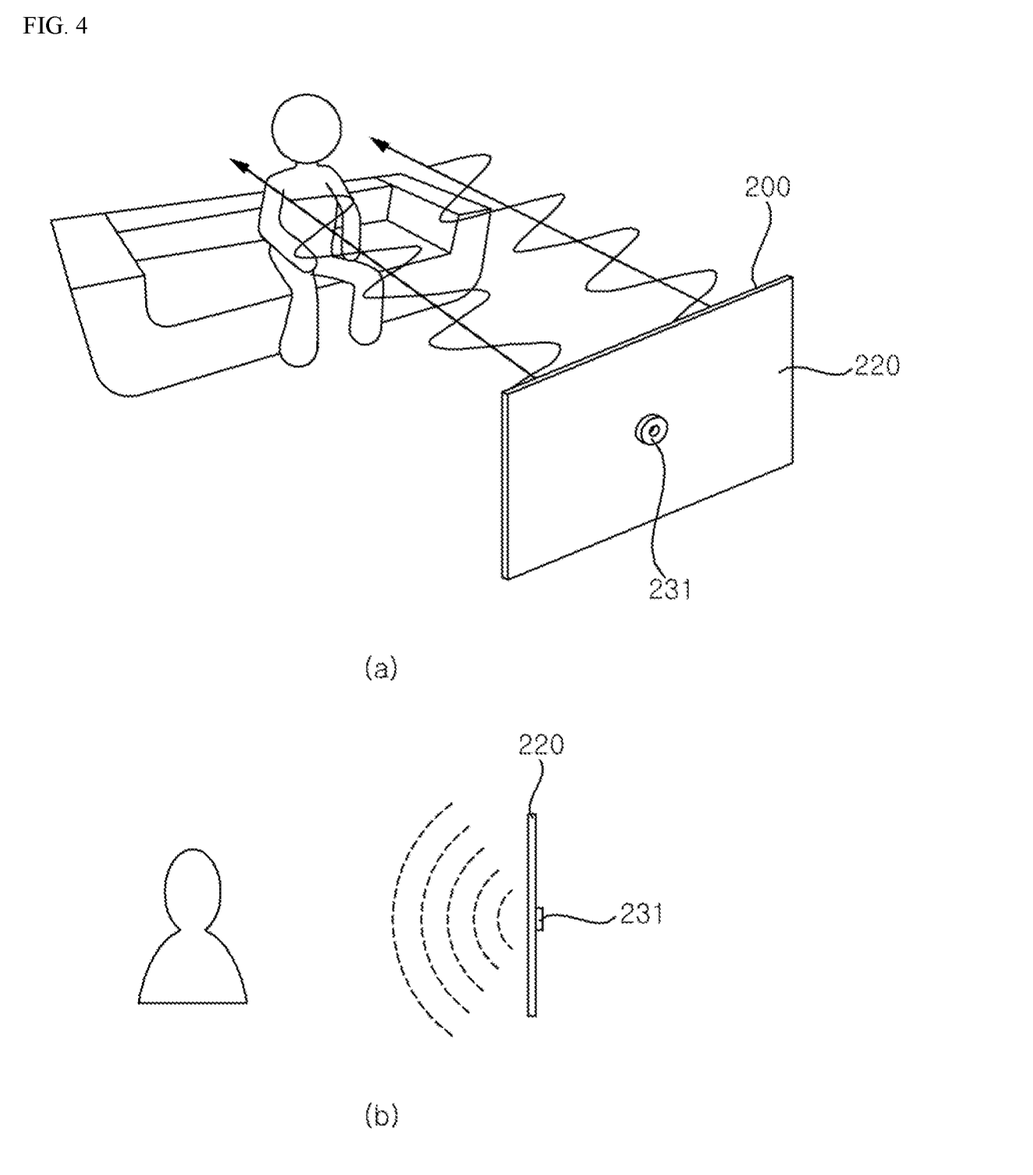
FIGS. 4 and 5 are diagrams referenced for explanation of audio output from the display device.
Figure 5:
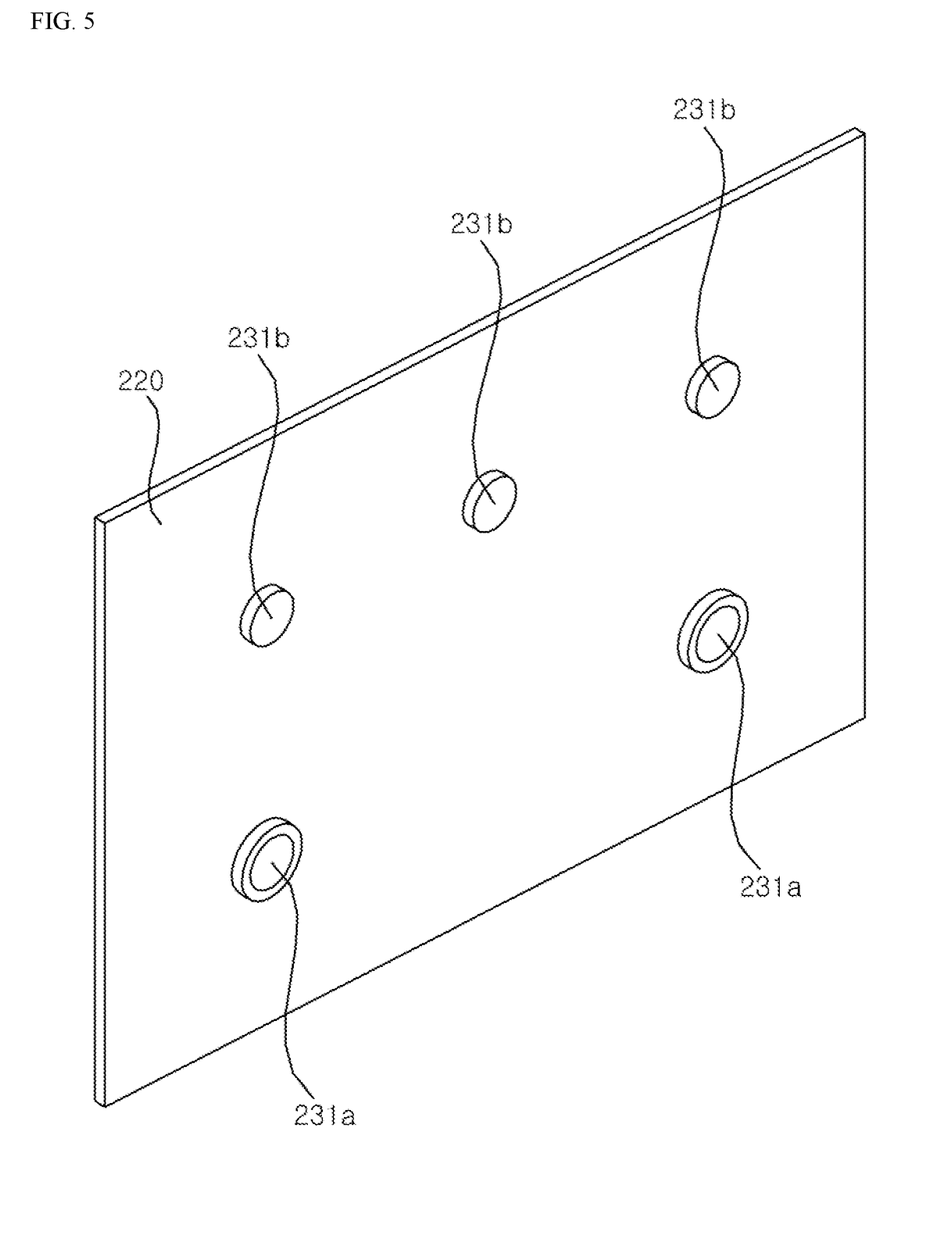

FIG. 3 is an internal block diagram of the display device of FIG. 1, and FIGS. 4 and 5 are diagrams referenced for explanation of audio output from the display device;

Referring to FIG. 3, the display device 200 may include an external device interface 210, a display 220, an audio output unit 230, a storage unit 240, and/or a controller 250.

The external device interface 210 may transmit/receive a signal including data to and from a connected external device. For example, the external device interface 210 may be connected to the control device 100 by wire, and may receive an image signal and/or an audio signal from the control device 100. In this case, power may be supplied from the control device 100 to the display device 200 through the external device interface 210.

The display 220 may generate a driving signal by converting the image signal, the data signal, the OSD signal, the control signal processed by the controller 250 or the data signal, the control signal, the image signal received from the external device interface 210, or the like.

The display 220 may include a display panel including a plurality of pixels and a panel driver.

The plurality of pixels included in the display panel may include RGB sub-pixels. Alternatively, the plurality of pixels included in the display panel may include RGBW sub-pixels.

The display 220 may generate driving signals for a plurality of pixels by converting the data signal, the OSD signal, the control signal and/or the image signal processed by the controller 250, or the data signal, the control signal and/or the image signal received from the external device interface 210, or the like.

The display 220 may be a Plasma Display Panel (PDP), a Liquid Crystal Display (LCD), an Organic Light Emitting Diode (OLED), a flexible display, or the like, and may also be a 3D display. The 3D display 220 may be classified into a glasses-free method and a glasses method.

The panel driver may drive the display panel based on a control signal and a data signal transmitted from the controller 250 or a signal transmitted from the control device 100 through the external device interface 210. The panel driver may include a gate driver and a data driver that supply scan signals and image signals to the display panel through gate lines and data lines, and a timing controller that controls the gate driver and data driver in response to the control signal.

Meanwhile, the display 220 may be configured as a touch screen and may be used as an input device as well as an output device.

The audio output unit 230 may receive an audio signal transmitted from the control device 100 through the external device interface 210 and output the audio signal as a voice.

Referring to FIG. 4, the audio output unit 230 may include at least one vibration generator 231. The vibration generator 231 may include an exciter that vibrates the display panel included in the display 220.

The vibration generator 231 may be mounted on the display panel of the display 220 and may vibrate the display panel in response to an audio signal. For example, the vibration generator 231 may be mounted on the rear side of the display panel and may vibrate the display panel so that a voice is output to the front of the display panel in which the user is located.

Meanwhile, referring to FIG. 5, a plurality of vibration generators 231a and 231b may be mounted on the display panel of the display 220.

The plurality of vibration generators 231a and 231b may independently vibrate an area in which each is disposed. For example, the first vibration generator 231a may be attached to the lower region of the display panel to vibrate the lower region of the display panel so that high-pitched sound and low-pitched sound are simultaneously generated, and the second vibration generator 231b is attached to the upper region of the display panel and may vibrate the upper region of the display panel to generate high-pitched sound.

Hereinafter, in order to distinguish between the audio output unit 185 provided in the control device 100 and the audio output unit 230 provided in the display device 200, the audio output unit 185 of the control device 100 is referred to as a sub audio output unit, and the audio output unit 230 provided in the display device 200 is referred to as a main audio output unit.

The storage unit 240 may store a program for processing and controlling each signal in the controller 250 or may store a signal-processed image, audio, or data signal. For example, the storage unit 240 may store application programs designed for performing various tasks that can be processed by the controller 250, and may provide some of the stored application programs selectively when requested by the controller 250.

Program, or the like stored in the storage unit 240 is not particularly limited as long as they can be executed by the controller 250.

The controller 250 may include at least one processor, and may control the overall operation of the display device 200 by using the processor included therein. Here, the processor may be a general processor such as a central processing unit (CPU). Obviously, the processor may be a dedicated device such as an ASIC or another hardware-based processor.

Meanwhile, according to various embodiments, the display device 200 may not include the storage unit 240 and/or the controller 250. For example, the display device 200 may be a device that operates according to a control signal received from the control device 100, or a device that provides a function of outputting an image signal received from the control device 100 as it is through the display 200 or outputting an audio signal as it is through the audio output unit 230.

Figure 6A:
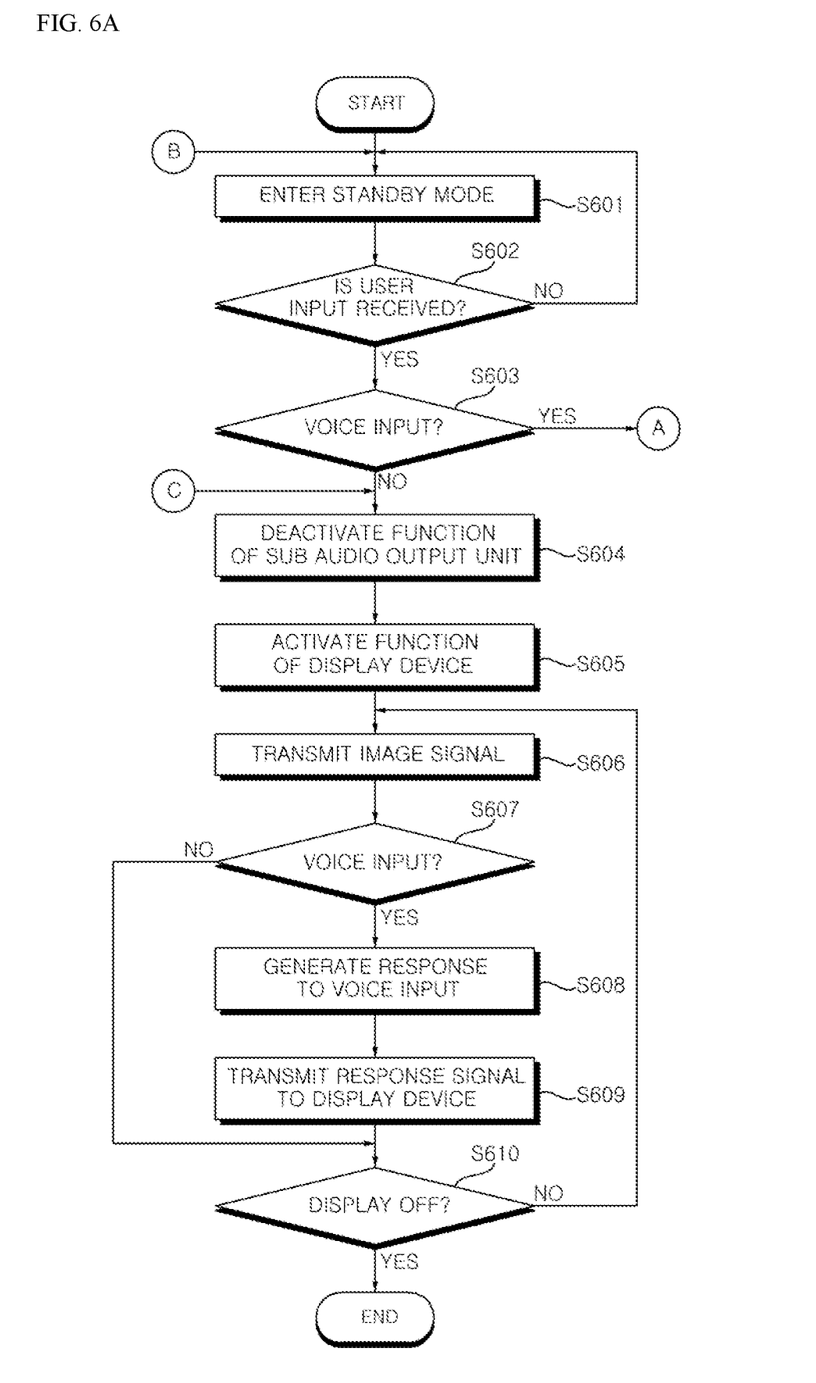
FIGS. 6A and 6B are flowcharts illustrating a method of operating the control device according to an embodiment of the present disclosure.
Figure 6B:
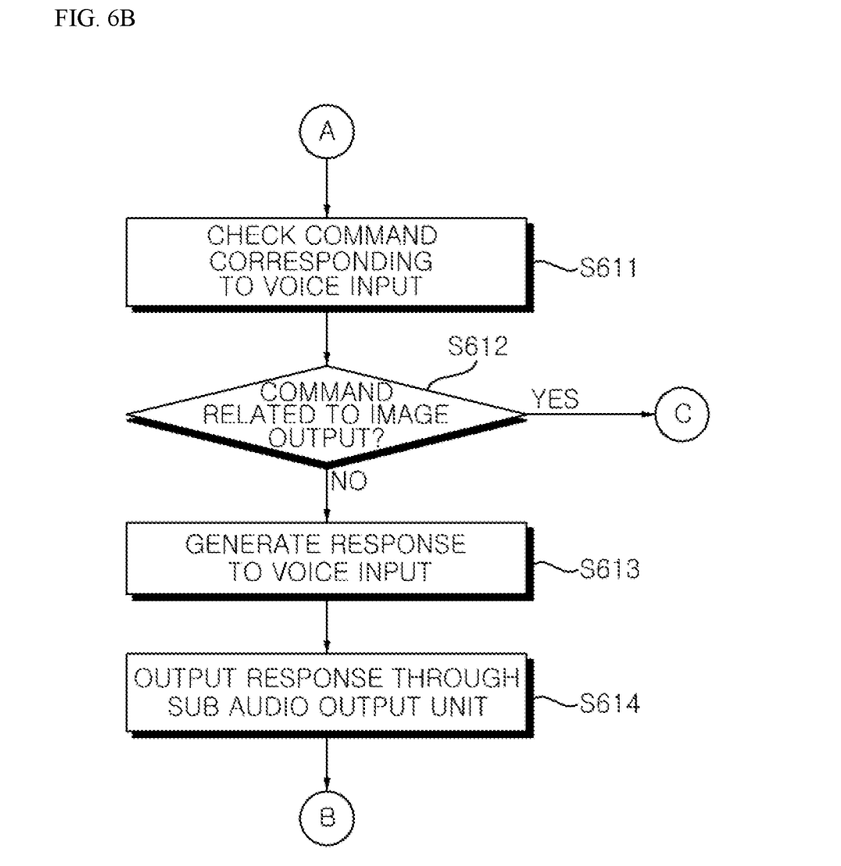

FIGS. 6A and 6B are flowcharts illustrating a method of operating the control device according to an embodiment of the present disclosure.

Referring to FIG. 6A, the control device 100 may enter a standby mode in operation S601. Here, the standby mode may mean a mode in which an operation and function of the display device 200 is deactivated and only the control device 100 is activated. For example, when an operation of outputting an image through the display device 200 is terminated, for example, when a signal for turning off the power is received from the remote control device 300 or a user input for pressing a local key for setting/releasing the standby mode provided in the input unit 160 is received, the control device 100 may enter the standby mode.

In this case, when entering the standby mode, the control device 100 may cut off the power supply to the display device 200 so that the function of the display device 200 is deactivated.

The control device 100 may monitor whether a user input is received through the user input interface 150 and/or the input unit 160 in operation S602.

When a user input is received, the control device 100 may check whether the received user input is a voice input corresponding to a voice spoken by the user in operation S603.

In operation S604, the control device 100 may release the standby mode and deactivate a function of the sub audio output unit 185 when a user input other than the voice input is received, for example, when a signal for turning on the power is received from the remote control device 300 or a user input by pressing the local key for setting/releasing the standby mode provided in the input unit 160 is received.

For example, when releasing the standby mode, the control device 100 may deactivate the function of the sub audio output unit 185 by cutting off power supplied from the power supply unit 190 to the sub audio output unit 185.

The control device 100 may activate a function of the display device 200 in operation S605. For example, the control device 100 may transmit a signal for activating a function of the display device 200 to the display device 200 through the external device interface 130.

In this case, the signal for activating the function of the display device 200 may be power supplied from the control device 100 to the display device 200. For example, when activating the function of the display device 200, the control device 100 may control the operation of each component so that power supplied from the power supply unit 190 is supplied to the display device 200 through the external device interface 130.

The control device 100 may transmit an image signal to the display device 200 through the external device interface 130 in operation S606. In this case, the display device 200 may output an image corresponding to the image signal received from the control device 100 through the display 220.

The control device 100 may check whether a voice input is received through the user input interface 150 and/or the input unit 160 in a state in which the standby mode is released in operation S607.

When a voice input is received, the control device 100 may generate a response to the voice input in operation S608. For example, the control device 100 may check a command included in a voice through voice recognition and may generate a response to the command.

The control apparatus 100 may transmit a signal including the generated response (hereinafter, a response signal) to the display device 200 through the external device interface 130 in operation S609. In this case, the response signal may include an image signal and/or an audio signal.

The control device 100 may check whether the operation of outputting the image from the display device 200 ends in operation S610. For example, the control device 100 may determine that the operation of outputting the image from the display device 200 is terminated, when a signal is received from the remote control device 300, a user input pressing the local key for setting/releasing the standby mode provided in the input unit 160 is received, a user input is not received through the user input interface 150 and/or the input unit 160 for a predetermined time, a user's gesture is not detected, or the like.

Meanwhile, referring to FIG. 6B, when a voice input is received, the control device 100 may check a command corresponding to the voice input in operation S611. For example, the control device 100 may directly check a command included in the voice through voice recognition or may check the command included in the voice based on data on the result of voice recognition received from an external server.

In operation S612, the control device 100 may check whether the command included in the voice is a command related to image output.

In operations S613 and S614, when the command included in the voice is not the command related to image output, the control device 100 may generate a response to the voice input based on the command included in the voice and may output the response through the sub audio output unit 185.

Figure 7:
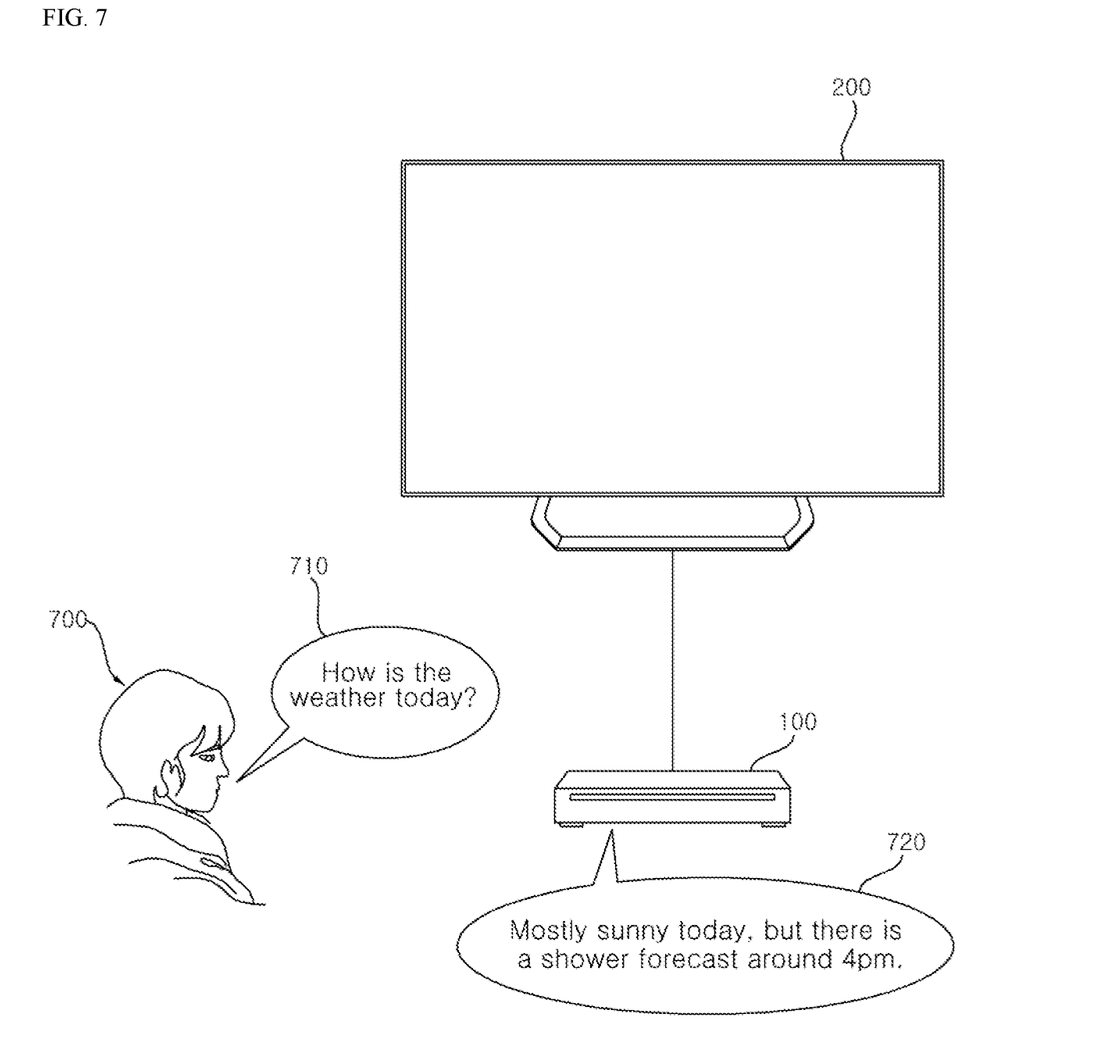
Figure 8A:
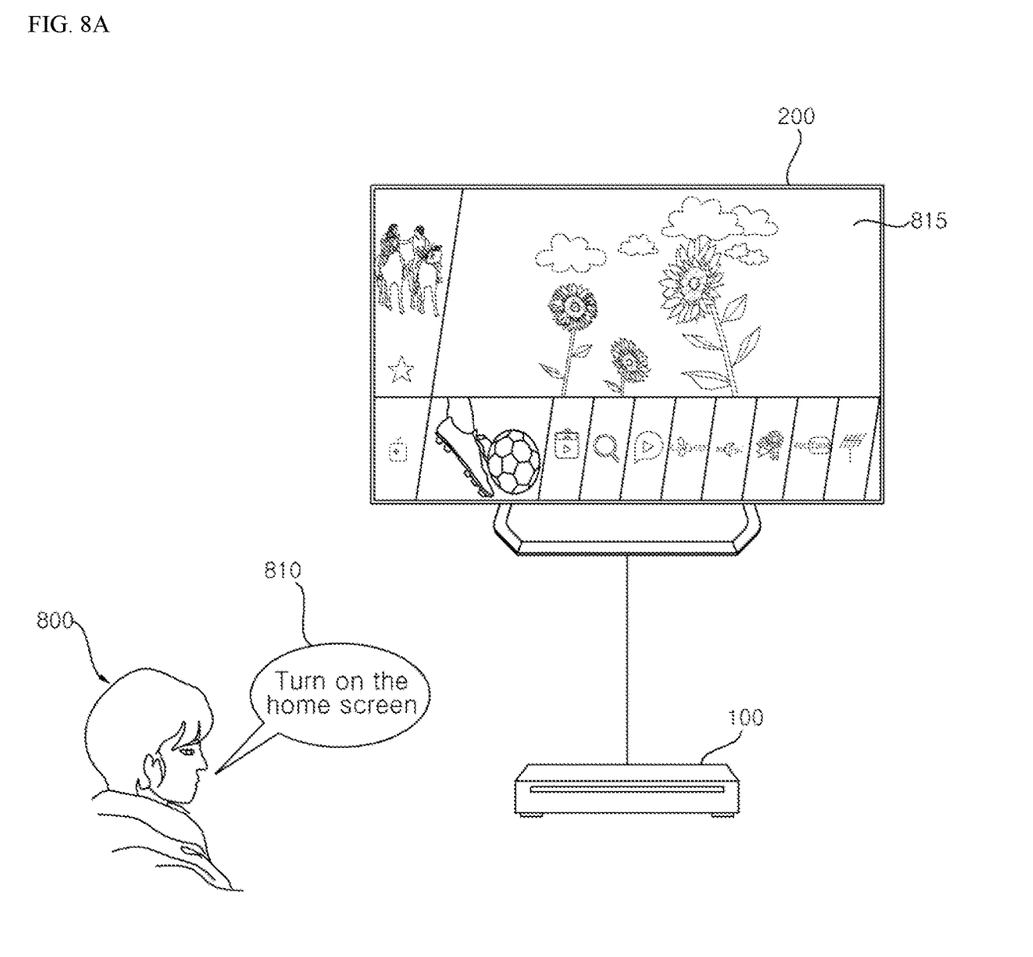
Figure 8B:
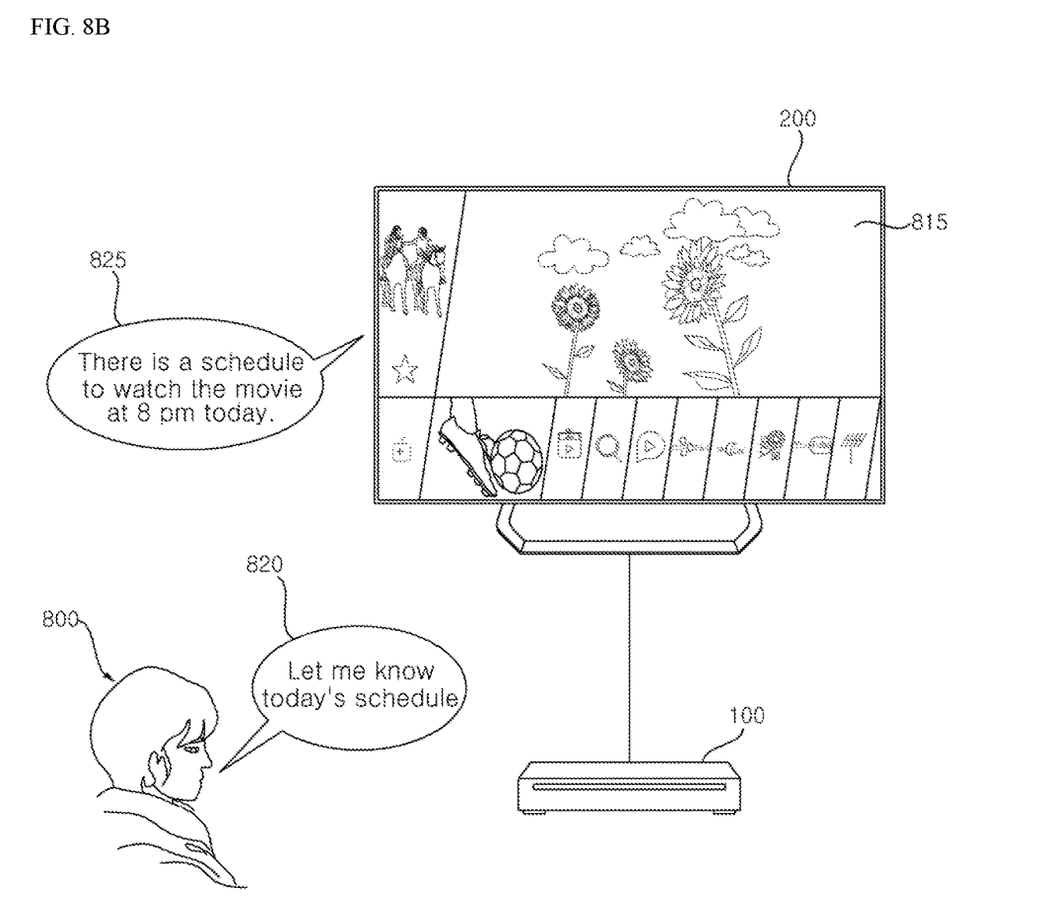

Meanwhile, the control device 100 may maintain the standby mode in operation S601 when the command included in the voice is not the command related to image output, and may release the standby mode in operation S604 when the command included in the voice is the command related to image output, FIGS. 7 to 8B are diagrams referenced for explaining a method of operating the control device.

Referring to FIG. 7, when a user 700 utters a voice 710 requesting confirmation of the current weather while a mode of the control device 100 is in the standby mode, the control device 100 may check a command included in the voice 710 uttered by the user. In this case, while the mode of the control device 100 is in the standby mode, power supply from the control device 100 to the display device 200 may be cut off.

Meanwhile, the control device 100 may confirm that the voice 710 uttered by the user 700 includes a command requesting confirmation of the current weather, and may confirm that the command is not the command related to image output.

In addition, the control device 100 may output a voice 720 for the current weather, which is a response to the command included in the voice 710 uttered by the user through the sub audio output unit 185, and may maintain the standby mode.

Meanwhile, referring to FIG. 8A, when a user 800 utters a voice 810 requesting output of the home screen 815 while the mode of the control device 100 is in the standby mode, the control device 100 may confirm that the voice 810 uttered by the user 800 includes a command requesting the output of the home screen 815.

In addition, the control device 100 may confirm that the command for requesting the output of the home screen 815 is the command related to image output, and may release the standby mode.

In this case, the control device 100 may activate a function of the display device 200 by supplying power to the display device 200 again when the standby mode is released, and may deactivate a function of the sub audio output unit 185 by cutting off power supplied from the power supply unit 190 to the sub audio output unit 185.

Meanwhile, the control device 100 may transmit an image signal corresponding to the home screen 815 to the display device 200 according to the received command, and the display device 200 may output the home screen 815 through the display 220 based on the image signal received from the control device 100.

Meanwhile, referring to FIG. 8B, when the user 800 utters a voice 820 requesting confirmation of a schedule while the home screen 815 is output through the display device 200, the control device 100 may confirm that the voice 820 uttered by the user 800 includes a command for requesting information on the schedule.

Meanwhile, as the control device 100 receives the voice 820 in a state in which the standby mode is released, the control device 200 may check a previously registered schedule in response to the command for requesting information on the schedule, and may transmit a audio signal corresponding to the confirmed schedule to the display device 200 as a response signal.

In addition, the display device 200 may output an audio 825 including information on the confirmed schedule through the main audio output unit 230 based on the audio signal received from the control device 100.

As described above, according to various embodiments of the present disclosure, since a function of the display device 200 is deactivated in the standby mode and a response to a command is output through the sub audio output unit 185 separately provided in the control device 100 until the command related to image output is received, there is no need to activate the function of the display device 200, so that power consumption of the entire system 10 can be effectively reduced.

In addition, according to various embodiments of the present disclosure, the control device 100 may supply power to the display device 200 when releasing the standby mode, and cut off the power supplied to the display device 200 when entering the standby mode, thereby minimizing power consumed by the display device 200 while maintaining the standby mode.

The accompanying drawings are used to assist in easy understanding of various technical features and it should be understood that the embodiments presented herein are not limited by the accompanying drawings. As such, the present disclosure should be construed to extend to any alterations, equivalents and substitutes falling within the spirit and scope of the present disclosure.

Meanwhile, an operating method of the server and the system including the same according to the present disclosure can be realized as a processor-readable code written on a recording medium readable by a processor included in the server and the system including the same. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. A control device comprising:
   an external device interface configured to transmit and receive signals to and from a display device;
   a user input interface configured to receive a user input;
   a power supply;
   an audio output device including a speaker configured to receive power supplied from the power supply; and
   a controller configured to:
   based on a first voice input being received through the user input interface in a standby mode in which the display device is deactivated, check a first command corresponding to the first voice input;
   output a response to the first command through the audio output device based on the first command not being a command related to image output;
   based on the first command being the command related to image output:
      transmit a signal to the display device through the external device interface to release the standby mode, the signal being for activating the display device;
      cut off power supplied from the power supply to the audio output device to deactivate the audio output device, based on the standby mode being released;
      based on a second voice input being received through the user input interface while the standby mode is released, check a second command corresponding to the second voice input; and
      transmit an audio signal to the display device through the external device interface, the audio signal corresponding to a response to the second command.

2. The control device according to claim 1, wherein the controller is further configured to:
   transmit an image signal to the display device through the external device interface based on the display device being activated.

3. The control device according to claim 1, wherein the signal for activating the display device is supplied to the display device from the external device interface,
   wherein the controller is further configured to:
   based on entering the standby mode, cut off power supplied to the display device so that display device is deactivated; and
   based on releasing the standby mode, supply power to the display device so that the display device is activated.

4. The control device according to claim 3, wherein the controller is further configured to enter the standby mode based on an input including a command for ending image output through the display device being received through the user input interface.

5. A system comprising:
   a display device; and
   a control device,
   wherein the display device comprises a display panel and a main audio output device,
   wherein the control device comprises a sub audio output device, and
   wherein the control device is configured to:
   based on a first voice input being received in a standby mode in which the display device is deactivated, check a first command corresponding to the first voice input;
   output a response to the first command through the sub audio output device based on the first command not being a command related to image output;
   based on the first command being the command related to image output:
      transmit a signal to the display device to release the standby mode, the signal being for activating the display device;
      cut off power supplied to the sub audio output device to deactivate the sub audio output device, based on the standby mode being released;
      based on a second voice input being received through the user input interface while the standby mode is released, check a second command corresponding to the second voice input; and
      transmit an audio signal to the display device, the audio signal corresponding to a response to the second command,
   wherein the display device is configured to output audio through the main audio output device, the audio corresponding to the audio signal received from the control device.

6. The system according to claim 5, wherein the control device is further configured to:
   transmit an image signal to the display device based on the display device being activated,
   wherein the display device is configured to output an image corresponding to the image signal received from the control device through the display panel.

7. The system according to claim 5, wherein the signal for activating the display device is supplied to the display device from an external device interface,
   wherein the display device is further configured to supply power to the display panel and the main audio output device based on power supplied from the control device.

8. The system according to claim 7, wherein the control device is further configured to:
   based on entering the standby mode, cut off power supplied to the display device so that the display device is deactivated; and
   based on releasing the standby mode, supply power to the display device so that the display device is activated.

9. The system according to claim 8, wherein the control device is further configured to enter the standby mode based on an input including a command for ending image output through the display device being received.

10. The system according to claim 9, wherein the main audio output device includes a vibration generator on the display panel,
    wherein the display device is further configured to control the display panel to vibrate in response to the audio signal through the vibration generator based on the audio signal being received from the control device.

* * * * *